US010511993B2

(12) United States Patent
Turtinen et al.

(10) Patent No.: US 10,511,993 B2
(45) Date of Patent: Dec. 17, 2019

(54) BUFFER STATUS REPORTING AND NEW QUALITY OF SERVICE FLOWS ON DEFAULT BEARER IN NEXT GENERATION RADIO ACCESS NETWORKS

(71) Applicant: Nokia Technologies Oy, Espoo (FI)

(72) Inventors: Samuli Heikki Turtinen, Ii (FI); Benoist Pierre Sebire, Tokyo (JP); Matti Einari Laitila, Oulu (FI); Guillaume Decarreau, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/913,375

(22) Filed: Mar. 6, 2018

(65) Prior Publication Data
US 2018/0270697 A1      Sep. 20, 2018

Related U.S. Application Data

(60) Provisional application No. 62/471,574, filed on Mar. 15, 2017.

(51) Int. Cl.
*H04L 12/927* (2013.01)
*H04W 24/10* (2009.01)
*H04W 28/02* (2009.01)
*H04W 72/10* (2009.01)
*H04W 72/12* (2009.01)

(52) U.S. Cl.
CPC ....... *H04W 28/0278* (2013.01); *H04L 47/805* (2013.01); *H04W 72/10* (2013.01); *H04W 72/1242* (2013.01); *H04W 24/10* (2013.01); *H04W 28/0268* (2013.01); *H04W 72/1284* (2013.01)

(58) Field of Classification Search
CPC ......... H04W 28/0278; H04W 72/1242; H04W 72/10; H04W 28/0268; H04W 72/1284; H04W 24/10; H04L 47/805; H04L 28/0268; H04L 72/1284; H04L 24/10
See application file for complete search history.

(56) References Cited

U.S. PATENT DOCUMENTS

| 2011/0211447 A1* | 9/2011 | Wang ................ H04W 72/1289 370/230 |
| 2012/0069805 A1* | 3/2012 | Feuersanger ..... H04W 72/1284 370/329 |
| 2017/0289046 A1* | 10/2017 | Faccin .................... H04L 47/20 |

FOREIGN PATENT DOCUMENTS

| WO | WO-2018071064 A1 * | 4/2018 | ............ H04W 76/15 |
| WO | WO-2018131902 A1 * | 7/2018 | ........ H04W 28/0252 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 8)", 3GPP TS 36.321, V8.12.0, Mar. 2012, pp. 1-47.

(Continued)

*Primary Examiner* — Moo Jeong
(74) *Attorney, Agent, or Firm* — Squire Patton Boggs (US) LLP

(57) ABSTRACT

Systems, methods, apparatuses, and computer program products for buffer status reporting and efficient handling of new quality of service (QoS) flows on the default bearer in next generation (NG) radio access networks (RAN) are provided.

17 Claims, 3 Drawing Sheets

(56) References Cited

OTHER PUBLICATIONS

"New SID Proposal: Study on New Radio Access Technology", 3GPP TSG RAN Meeting #71, RP-160671, Agenda Item: 9.1, NTT Docomo, Mar. 7-10, 2016, 8 pages.
"3rd Generation Partnership Project; Technical Specification Group Radio Access Network; Study on New Radio Access Technology; Radio Interface Protocol Aspects(Release 14)", 3GPP TR 38.804, V1.0.0, Mar. 2017, pp. 1-56.
"BSR Enhancement for New RAT", 3GPP TSG-RAN WG2 NR Ad Hoc, R2-17xx01, Agenda Item : 3.2.1.4 (FS_NR_newRAT), Jan. 17-19, 2017, 2 pages.
"Discussion on SR and BSR in NR", 3GPP TSG-RAN WG2 Meeting #97, R2-1701448, Agenda Item: 10.2.1.4, ASUSTeK, Feb. 13-17, 2017, 4 pages.
"Enhancements of SR/BSR in NR", 3GPP TSG RAN WG2 Meeting #97, R2-1701723, Agenda item: 10.2.1.4, Intel Corporation, Feb. 13-17, 2017, 3 pages.

* cited by examiner

BUFFER STATUS REPORTING AND NEW QUALITY OF SERVICE FLOWS ON DEFAULT BEARER IN NEXT GENERATION RADIO ACCESS NETWORKS

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to buffer status reporting and efficient handling of new quality of service (QoS) flows on the default bearer in next generation (NG) radio access networks (RAN).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation (5G) or new radio (NR) wireless systems refer to the next generation (NG) of radio systems and network architecture. 5G is expected to provide higher bitrates and coverage than the current LTE systems. It is estimated that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

SUMMARY

In a first aspect thereof the exemplary embodiments of this invention provide a method that comprises triggering transmission of a buffer status report when data, from a new quality of service flow that is different from any quality of service flow for which data is already available for transmission, arrives in a buffer of a user equipment; and including an indication of the new quality of service flow in the buffer status report.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to trigger transmission of a buffer status report when data, from a new quality of service flow that is different from any quality of service flow for which data is already available for transmission, arrives in a buffer of the apparatus; and include an indication of the new quality of service flow in the buffer status report.

In another aspect thereof the exemplary embodiments of this invention provide an apparatus that comprises at least one data processor and at least one memory that includes computer program code. The at least one memory and computer program code are configured, with the at least one data processor, to cause the apparatus, at least to configure at least one user equipment to trigger transmission of a buffer status report when data, from a quality of service flow that is different from any quality of service flow for which data is already available for transmission, arrives in a buffer of the user equipment; and configure the buffer status report to include an indication of the new quality of service flow.

BRIEF DESCRIPTION OF THE DRAWINGS

For proper understanding of the invention, reference should be made to the accompanying drawings, wherein.

DETAILED DESCRIPTION

Figure 1:
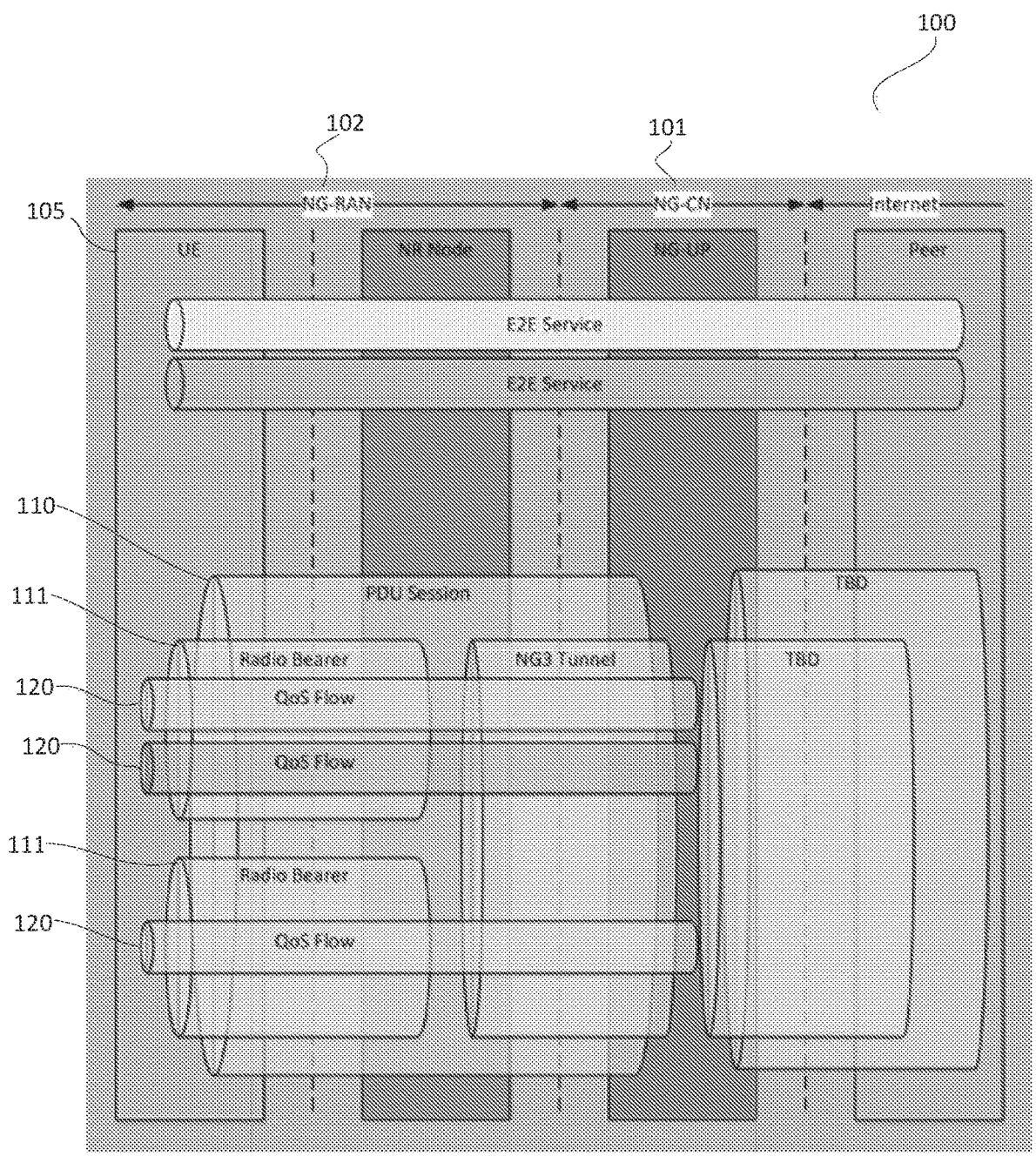
FIG. 1 illustrates an example of a QoS system architecture in new radio access technology (NR), according to an embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for buffer status reporting and efficient handling of new quality of service (QoS) flows on the default bearer in next generation (NG) radio access networks (RAN), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

To assist the scheduler, an eNB can configure UEs to send Buffer Status Reports (BSRs) and/or Power Headroom Reports (PHR) in uplink (UL). BSRs may indicate the amount of data the UE has available for transmission, while PHR may provide the eNB with information about the difference between the nominal UE maximum transmit power and the estimated power for the uplink shared channel (UL-SCH) transmission. BSRs may be used, for example, by the eNB to choose an appropriate transport block size. PHR may be used, for example, to select an appropriate coding scheme (MCS) and number of allocated Physical Resource Blocks (PRBs). Among other conditions, in E-UTRA a buffer status report (BSR) may be triggered in the UE, for example, if data arrives in the UE buffer which has higher priority than the data already available for transmission, and/or if new data arrives in an empty UE buffer.

If the UE has no allocation available on the Physical Uplink Shared Channel (PUSCH) for the transmission time interval (TTI) where the BSR is triggered, a Scheduling Request (SR) may then be triggered. The SR may be transmitted on the Physical Uplink Control Channel (PUCCH) using dedicated resources which are allocated on a UE basis with a certain periodicity. Details on the triggering of SRs and BSRs can be found, for example, in Sections 5.4.4 and 5.4.5 of 3GPP TR 36.321. It is noted that BSRs may report the buffer status of a logical channel group (LCG). Logical channels can be divided in up to 4 different LCGs based, for example, on priority of data, etc. Also, it is noted that BSRs/SRs may also be triggered based on configurations of periodical BSR.

One of the goals of new radio access technology (NR) is to allow for a more flexible QoS (Quality of Service Framework). Agreements on this framework have been captured in 3GPP TR 38.804, the contents of which are hereby incorporated by reference in its entirety.

FIG. 1 illustrates an example of a QoS architecture 100 in NR and NextGen Core (NG-CN) 101, according to certain embodiments. For each UE 105, the NextGen Core 101 may establish one or more PDU Sessions 110. For each UE 105, the RAN 102 may establish one or more Data Radio Bearers (DRBs) 111 per PDU Session 110. The RAN 102 may map packets belonging to different PDU sessions 110 to different DRBs 111. Hence, the RAN 102 may establish at least one default DRB 111 for each PDU Session 110 indicated by the NG-CN 101 upon PDU Session establishment. Non-access stratum (NAS) level packet filters in the UE 105 and in the NextGen Core 101 may associate UL and DL packets with QoS Flows 120. Access stratum (AS)-level mapping in the UE 105 and in the RAN 102 may associate UL and DL QoS Flows 120 with DRBs 111.

NextGen Core 101 and RAN 102 may ensure the quality of service (e.g., reliability and target delay) by mapping packets to appropriate QoS Flows 120 and DRBs 111. Accordingly, there is a 2-step mapping of IP-flows to QoS flows (NAS) and from QoS flows to DRBs (Access Stratum).

In NR, the DRB 111 defines the packet treatment on the radio interface (Uu). A DRB 111 may serve packets with the same packet forwarding treatment. Separate DRBs 111 may be established for QoS flows 120 requiring different packet forwarding treatment. In the downlink, the RAN 102 may map QoS flows 120 to DRBs 111 based on NG3 marking (e.g., QoS Flow ID) and the associated QoS profiles. In the uplink, the UE 105 may mark uplink packets over Uu with the QoS flow ID for the purposes of marking forwarded packets to the CN 101.

In the uplink, the RAN 102 may control the mapping of QoS flows 120 to DRB 111 in at least two different ways, reflective mapping or explicit configuration. In reflective mapping, for each DRB 111, the UE 105 may monitor the QoS flow ID(s) of the downlink packets and may apply the same mapping in the uplink; that is, for a DRB 111, the UE 105 may map the uplink packets belonging to the QoS flow(s) 120 corresponding to the QoS flow ID(s) and PDU Session 110 observed in the downlink packets for that DRB 111. To enable this reflective mapping, the RAN 102 may mark downlink packets over Uu with QoS flow ID. It should be noted that the marking with a QoS flow ID may be semi-statically configured (i.e., to not include the QOS flow ID when not needed) or not.

In explicit configuration, the RAN 102 may configure by RRC an uplink "QoS Flow to DRB mapping". The precedence of the RRC configured mapping and reflective QoS may take different forms. For example, it is possible that a reflective QoS update may override an RRC configured mapping. Alternatively, it is possible that a configured QoS Flow ID to DRB mapping may take precedence over a reflective mapping.

If an incoming UL packet matches neither an RRC configured nor a reflective "QoS Flow ID to DRB mapping,"

then the UE 105 may map that packet to the default DRB of the PDU session. Within each PDU session 110, it is up to RAN 102 how to map multiple QoS flows 120 to a DRB 111. The RAN 102 may map a GBR flow and a non-GBR flow, or more than one GBR flow to the same DRB 111. The timing of establishing non-default DRB(s) between RAN 102 and UE 105 for QoS flow 120 configured during establishing a PDU session 110 may be different from the time when the PDU session 110 is established. It is up to RAN 102 as to when non-default DRBs are established.

A problem may arise when an incoming UL packet matches neither an RRC configured nor a reflective "QoS Flow ID to DRB mapping." In this case, the UE is supposed to map that packet to the default DRB of the PDU session. However, using the agreed LTE baseline, it is not possible to distinguish the arrival of a packet belonging to a new QoS flow ID on the existing DRB from the arrival of a packet from an existing QoS flow ID or from packet(s) already buffered from other QoS flow ID(s).

In view of the above, according to an embodiment, in order for the scheduler to be made aware of the appearance of a new QoS flow ID on the default bearer, a new BSR trigger is provided. In this embodiment, a BSR may be triggered if data, from a QoS flow that is different from any of the QoS flows for which data is already available for transmission, arrives in the UE buffer.

According to a further embodiment, the BSR report may be modified so that information on the appearance of a new QoS flow is indicated. In on embodiment, this indication may be in the form of one-bit to signal that a new QoS flow has appeared on the default bearer, or the QoS flow ID itself can be included to allow the RAN to determine the proper actions, such as relocation to another DRB.

When multiple such new QoS flows are received in the buffer before the BSR is transmitted, certain embodiments provide several options. For example, in an embodiment, all of the new QoS flows may be indicated in the BSR report, only the first new QoS flow ID in the buffer may be indicated in the BSR report, there may be an indication of multiple QoS flows in the buffer, or the QoS flow ID with the tightest QoS requirements may be indicated. Additionally, in an embodiment, a one-bit indication could be reserved for indication of multiple new QoS flows in the buffer. As one example, for the UE to identify the QoS flow with tightest requirements, the UE should have received some information about the QoS requirements of QoS flows from the network.

In another embodiment, if the QoS flow ID is not included in the BSR, to allow the RAN to determine proper actions for a QoS flow as early as possible, the first packet of the new QoS flow ID may be prioritized for transmission in uplink by the UE, e.g., bypass all other buffered packets from other QoS flow IDs. According to yet another embodiment, if duplication is possible on the default bearer, then this first packet could also be duplicated. The prioritization and/or duplication may be used, for example, if the QoS flow ID cannot be included in the BSR report but it only indicates the existence of a new QoS flow ID in the buffer.

According to some embodiments, the indication about the new QoS flow ID in the buffer may be indicated by the "New AS layer" to medium access control (MAC) directly, or the "New AS layer" may indicate this to packet data convergence protocol (PDCP) and PDCP may indicate to MAC (e.g., to better preserve the legacy operation).

Figure 2A:
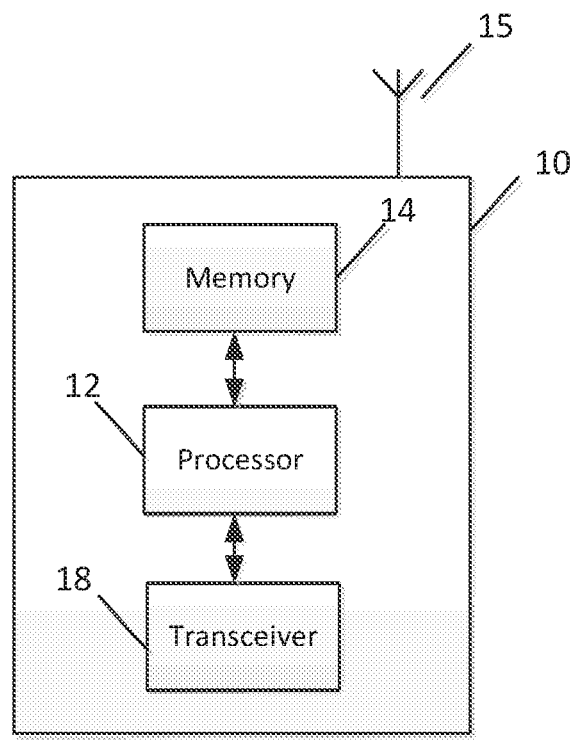
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR. It should be noted that one of ordinary skill in the art would understand that apparatus 10 may include components or features not shown in FIG. 2a.

As illustrated in FIG. 2a, apparatus 10 may include a processor 12 for processing information and executing instructions or operations. Processor 12 may be any type of general or specific purpose processor. While a single processor 12 is shown in FIG. 2a, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, node B, eNB, 5G node B (gNB) or access point, WLAN access point, or the like. According to certain embodiments, apparatus 10 may be controlled by memory 14 and processor 12 to perform the functions associated with embodiments described herein. For example, in one embodiment, apparatus 10 may be controlled by memory 14 and processor 12 to configure one or more UEs to trigger or cause transmission of a BSR when data, from a QoS flow that is different from any QoS flow for which data is already available for transmission, arrives in a buffer of the UE(s). In an embodiment, the BSR may be configured or modified to include an indication of the appearance of a new QoS flow.

According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, apparatus 10 may be controlled by memory 14 and processor 12 to receive the BSR from the UE(s). The indication received in the BSR may then allow apparatus 10 to determine the proper actions to take, such as relocation to another DRB.

If multiple new QoS flows are received in the buffer of the UE before the BSR is transmitted, then all new QoS flows may be indicated in the BSR report, the first new QoS flow ID in the buffer may be indicated in the BSR report, multiple QoS flows in the buffer may be indicated, or the QoS flow ID with the tightest QoS requirements may be indicated. Also, a one bit indication may be reserved for the indication of multiple new QoS flows in the buffer.

In another embodiment, if the QoS flow ID is not included in the BSR, in order to allow the apparatus 10 to determine proper actions for a QoS flow as early as possible, then the first packet of the new QoS flow ID may be prioritized for transmission in uplink by the UE. Furthermore, in one embodiment, if duplication is possible on the default bearer, that first packet could also be duplicated. The prioritization and/or duplication may be used if the QoS flow ID cannot be included in the BSR report but it only indicates the existence of a new QoS flow ID in the buffer.

Figure 2B:
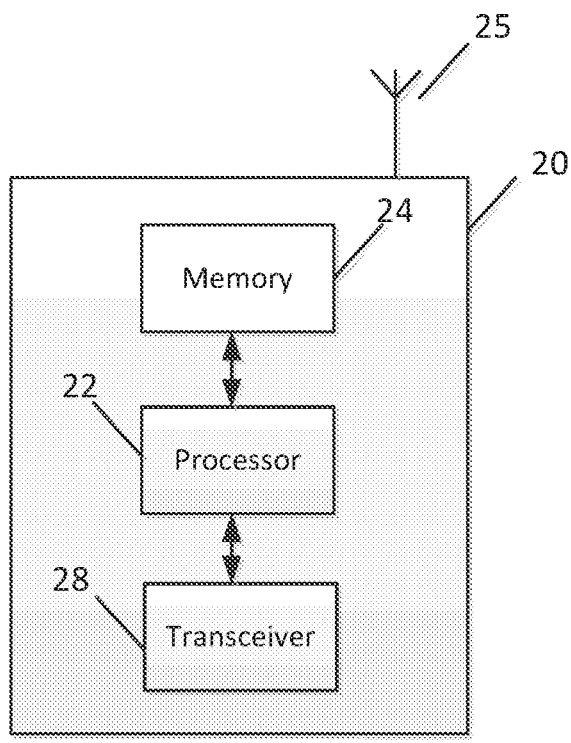
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, Apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, NB-IoT, LTE, LTE-A, 5G, WLAN, WiFi, Bluetooth, NFC, and any other radio access technologies. It should be noted that one of ordinary skill in the art would understand that apparatus 20 may include components or features not shown in FIG. 2b.

As illustrated in FIG. 2b, apparatus 20 may include or be coupled to a processor 22 for processing information and executing instructions or operations. Processor 22 may be any type of general or specific purpose processor. While a single processor 22 is shown in FIG. 2b, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, NB-IoT, LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. In an embodiment, apparatus 20 may be controlled by memory 24 and processor 22 to trigger or cause transmission of a BSR when data, from a QoS flow that is different from any QoS flow for which data is already available for transmission, arrives in a buffer of the apparatus 20. In an embodiment, the BSR may be configured or modified to include an indication of the appearance of a new QoS flow.

According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, apparatus 20 may be controlled by memory 24 and processor 22 to transmit the BSR to the RAN. The indication transmitted in the BSR may then allow the RAN to determine the proper actions to take, such as relocation to another DRB.

If multiple new QoS flows are received in the buffer of the apparatus 20 before the BSR is transmitted, then apparatus 20 may be controlled by memory 24 and processor 22 to indicate all new QoS flows in the BSR report, to indicate the first new QoS flow ID in the buffer in the BSR report, to indicate multiple QoS flows in the buffer, or to indicate the QoS flow ID with the tightest QoS requirements. Also, a one bit indication may be reserved for the indication of multiple new QoS flows in the buffer.

In another embodiment, if the QoS flow ID is not included in the BSR, in order to allow the RAN to determine proper actions for a QoS flow as early as possible, then apparatus 20 may be controlled by memory 24 and processor 22 to prioritize the first packet of the new QoS flow ID. Furthermore, in one embodiment, if duplication is possible on the default bearer, that first packet could also be duplicated. The prioritization and/or duplication may be used if the QoS flow ID cannot be included in the BSR report but it only indicates the existence of a new QoS flow ID in the buffer.

Figure 3A:
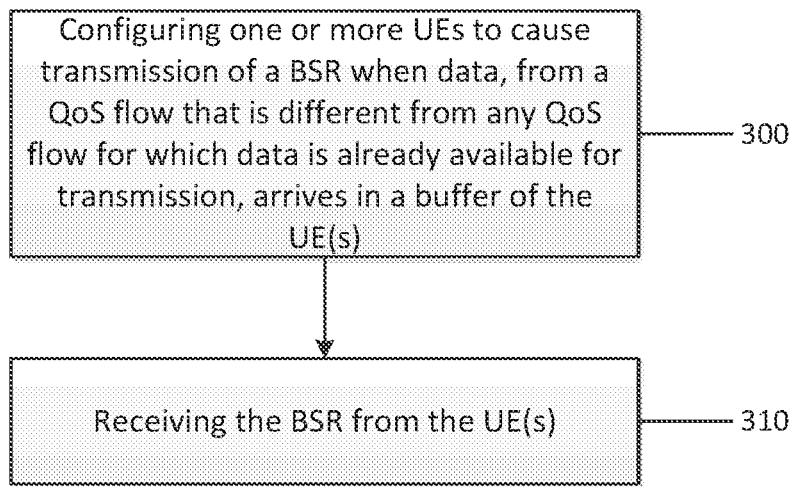
FIG. 3a illustrates an example flow diagram of a method, according to one embodiment.

FIG. 3a illustrates an example flow diagram of a method, according to one embodiment. The method of FIG. 3a may be performed, for example, by a network node, such as a base station, access point, eNB, gNB, or the like. As illustrated in FIG. 3a the method may include, at 300, configuring one or more UEs to trigger or cause transmission of a BSR when data, from a QoS flow that is different from any QoS flow for which data is already available for transmission, arrives in a buffer of the UE(s). In an embodiment, the configuring may include modifying the BSR to include an indication of the appearance of a new QoS flow.

According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the method may also include, at 310, receiving the BSR from the UE(s). The method may then include determining the proper actions to take based on the indication received in the BSR. For instance, the proper actions may include relocation of the QoS flow to another DRB.

If multiple new QoS flows are received in the buffer of the UE before the BSR is transmitted, then all new QoS flows may be indicated in the BSR report, the first new QoS flow ID in the buffer may be indicated in the BSR report, multiple QoS flows in the buffer may be indicated, or the QoS flow ID with the tightest QoS requirements may be indicated. Also, a one bit indication may be reserved for the indication of multiple new QoS flows in the buffer.

In another embodiment, if the QoS flow ID is not included in the BSR, in order to allow the network node to determine proper actions for a QoS flow as early as possible, then the first packet of the new QoS flow ID may be prioritized for transmission in uplink by the UE. Furthermore, in one embodiment, if duplication is possible on the default bearer, that first packet could also be duplicated. The prioritization and/or duplication may be used if the QoS flow ID cannot be included in the BSR report but it only indicates the existence of a new QoS flow ID in the buffer.

Figure 3B:
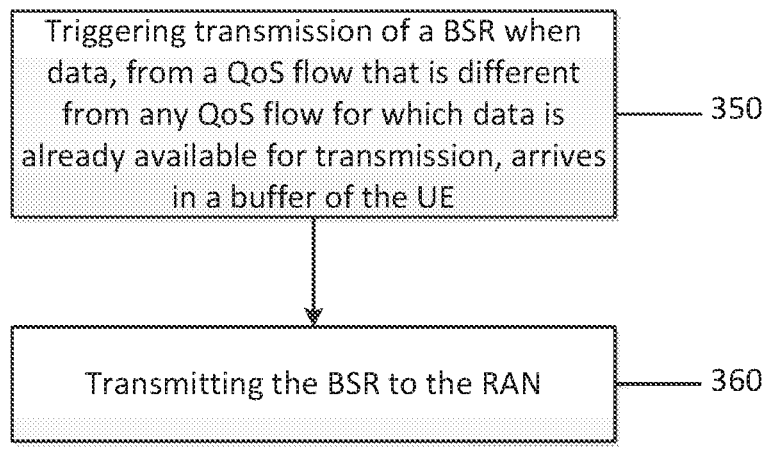
FIG. 3b illustrates an example flow diagram of a method, according to another embodiment.

FIG. 3b illustrates an example flow diagram of a method, according to one embodiment. The method of FIG. 3b may be performed, for example, by a UE, mobile station, mobile device, IoT device, or the like. As illustrated in FIG. 3b the method may include, at 350, triggering or causing transmission of a BSR when data, from a QoS flow that is different from any QoS flow for which data is already available for transmission, arrives in a buffer of the UE. In an embodiment, the BSR may be configured or modified to include an indication of the appearance of a new QoS flow.

According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the method may include, at 360, transmitting the BSR to the RAN. It is noted that in certain embodiments step 360 may be combined with step 350. The indication transmitted in the BSR may then allow the RAN to determine the proper actions to take, such as relocation to another DRB.

If multiple new QoS flows are received in the buffer of the UE before the BSR is transmitted, then the transmitting of the BSR may include indicating all new QoS flows in the BSR report, indicating the first new QoS flow ID in the buffer in the BSR report, indicating multiple QoS flows in the buffer, or indicating the QoS flow ID with the tightest QoS requirements. Also, a one bit indication may be reserved for the indication of multiple new QoS flows in the buffer.

In another embodiment, if the QoS flow ID is not included in the BSR, in order to allow the RAN to determine proper actions for a QoS flow as early as possible, then the method may include prioritizing the first packet of the new QoS flow ID. Furthermore, in one embodiment, if duplication is possible on the default bearer, that first packet could also be duplicated. The prioritization and/or duplication may be used if the QoS flow ID cannot be included in the BSR report but it only indicates the existence of a new QoS flow ID in the buffer.

In view of the above, embodiments of the invention provide several technical improvements and/or advantages. For example, certain embodiments provide for more efficient handling of new QoS flow ID(s) on the default bearer. As such, embodiments of the invention can improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One embodiment is directed to a method that may include configuring one or more UEs to trigger or cause transmission of a BSR when data, from a QoS flow that is different from any QoS flow for which data is already available for transmission, arrives in a buffer of the UE(s). In an embodiment, the configuring may include modifying the BSR to include an indication of the appearance of a new QoS flow.

According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the method may also include receiving the BSR from the UE(s). The method may then include determining the proper actions to take based on the indication received in the BSR. For instance, the proper actions may include relocation of the QoS flow to another DRB.

Another embodiment is directed to an apparatus that may include at least one processor and at least one memory including computer program code. The at least one memory and the computer program code are configured, with the at least one processor, to cause the apparatus at least to configure one or more UEs to trigger or cause transmission of a BSR when data, from a QoS flow that is different from any QoS flow for which data is already available for transmission, arrives in a buffer of the UE(s). In an embodiment, the apparatus may configure the UE to modify the BSR to include an indication of the appearance of a new QoS flow.

According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the at least one memory and the computer program code are further configured, with the at least one processor, to cause the apparatus at least to receive the BSR from the UE(s). In an embodiment, the at least one memory and the computer program code are further configured, with the at least one processor, to cause the apparatus at least to determine the proper actions to take based on the indication received in the BSR. For instance, the proper actions may include relocation of the QoS flow to another DRB.

Another embodiment is directed to an apparatus that may include configuring means for configuring one or more UEs to trigger or cause transmission of a BSR when data, from a QoS flow that is different from any QoS flow for which data is already available for transmission, arrives in a buffer of the UE(s). In an embodiment, the configuring means may include means for causing the UE to modify the BSR to include an indication of the appearance of a new QoS flow.

According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the apparatus may also include receiving means for receiving the BSR from the UE(s). The apparatus may then include determining means for determining the proper actions to take based on the indication received in the BSR. For instance, the proper actions may include relocation of the QoS flow to another DRB.

Another embodiment is directed to a method that may include triggering or causing transmission of a BSR when data, from a QoS flow that is different from any QoS flow for which data is already available for transmission, arrives in a buffer of a UE. In an embodiment, the triggering may include modifying or configuring the BSR to include an indication of the appearance of a new QoS flow. According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the method may also include transmitting the BSR to the RAN. The indication transmitted in the BSR may then allow the RAN to determine the proper actions to take, such as relocation to another DRB.

Another embodiment is directed to an apparatus that may include at least one processor and at least one memory including computer program code. The at least one memory and the computer program code are configured, with the at least one processor, to cause the apparatus at least to trigger or cause transmission of a BSR when data, from a QoS flow that is different from any QoS flow for which data is already available for transmission, arrives in a buffer of a UE. In an embodiment, the at least one memory and the computer program code may be configured, with the at least one processor, to cause the apparatus at least to modify or configure the BSR to include an indication of the appearance of a new QoS flow. According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the at least one memory and the computer program code may be configured, with the at least one processor, to cause the apparatus at least to transmit the BSR to the RAN. The indication transmitted in the BSR may then allow the RAN to determine the proper actions to take, such as relocation to another DRB.

Another embodiment is directed to an apparatus that may include triggering means for triggering or causing transmission of a BSR when data, from a QoS flow that is different from any QoS flow for which data is already available for transmission, arrives in a buffer of a UE. In an embodiment, the triggering means may include means for modifying or configuring the BSR to include an indication of the appearance of a new QoS flow. According to one embodiment, the indication of the appearance of a new QoS flow may be in the form of a one-bit flag to signal that a new QoS flow has appeared on the default bearer. In another embodiment, the indication may be including the QoS flow ID itself in the BSR. According to one embodiment, the apparatus may also include transmitting means for transmitting the BSR to the RAN. The indication transmitted in the BSR may then allow the RAN to determine the proper actions to take, such as relocation to another DRB.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method comprising:
triggering transmission of a buffer status report when data, from a new quality of service flow ID that is different from any quality of service flow ID for which data is already available for transmission, arrives in a buffer of a user equipment, wherein the new quality of service flow ID is an identification of a new quality of service flow;
including an indication of the new quality of service flow ID in the buffer status report; and
transmitting the buffer status report to a radio access network, wherein the transmitting of the buffer status report causes the radio access network to relocate the new quality of service flow to another data radio bearer.

2. The method as in claim 1, wherein the indication of the new quality of service flow ID is a one-bit flag to signal that the new quality of service flow has appeared on a default bearer.

3. The method as in claim 2, wherein first packet of the new quality of service flow is prioritized or duplicated by the user equipment.

4. The method as in claim 1, wherein the indication of the new quality of service flow ID in the buffer status report comprises the identification of the new quality of service flow.

5. The method as in claim 1 wherein the indication comprises one of indicating all new quality of service flows in the buffer status report, indicating first new quality of service flow identification in the buffer status report, indicating multiple new quality of service flows in the buffer status report, or indicating a new quality of service flow identification with tightest quality of service requirements if multiple new quality of service flows are received in the buffer of the user equipment before the buffer status report is transmitted.

6. The method as in claim 5, wherein a one bit indication is reserved for the indication of multiple new quality of service flows in the buffer.

7. An apparatus, comprising:
at least one processor; and
at least one memory including compute program instructions,
wherein the at least one memory and computer program instructions are configured to, with the at least one processor, cause the apparatus at least to:
trigger transmission of a buffer status report when data, from a new quality of service flow ID that is different from any quality of service flow ID for which data is already available for transmission, arrives in a buffer of the apparatus, wherein the new quality of service flow ID is an identification of a new quality of service flow;
include an indication of the new quality of service flow ID in the buffer status report; and
transmit the buffer status report to a radio access network, wherein the transmitting of the buffer status report causes the radio access network to relocate the new quality of service flow to another data radio bearer.

8. The apparatus as in claim 7, wherein the indication of the new quality of service flow ID is a one-bit flag to signal that the new quality of service flow has appeared on a default bearer.

9. The apparatus as in claim 8, wherein first packet of the new quality of service flow is prioritized or duplicated by the apparatus.

10. The apparatus as in claim 7, wherein the indication of the new quality of service flow ID in the buffer status report comprises the identification of the new quality of service flow.

11. The apparatus as in claim 7, wherein the indication comprises one of indicating all new quality of service flows in the buffer status report, indicating first new quality of service flow identification in the buffer status report, indicating multiple new quality of service flows in the buffer status report, or indicating a new quality of service flow identification with tightest quality of service requirements if multiple new quality of service flows are received in the buffer of the user equipment before the buffer status report is transmitted.

12. The apparatus as in claim 11, wherein a one bit indication is reserved for the indication of multiple new quality of service flows in the buffer.

13. An apparatus, comprising:
   at least one processor; and
   at least one memory including compute program instructions,
   wherein the at least one memory and computer program instructions are configured to, with the at least one processor, cause the apparatus at least to:
   configure at least one user equipment to trigger transmission of a buffer status report when data, from a new quality of service flow ID that is different from any quality of service flow ID for which data is already available for transmission, arrives in a buffer of the user equipment, wherein the new quality of service flow ID is an identification of a new quality of service flow;
   configure the buffer status report to include an indication of the new quality of service flow ID;
   receive the buffer status report from the user equipment; and
   relocate the new quality of service flow to another data radio bearer based on the indication in the received buffer status report.

14. The apparatus as in claim 13, wherein the indication of the new quality of service flow ID is a one-bit flag to signal that the new quality of service flow has appeared on a default bearer.

15. The apparatus as in claim 14, wherein first packet of the new quality of service flow ID is prioritized or duplicated by the user equipment.

16. The apparatus as in claim 13, wherein the indication of the new quality of service flow ID in the buffer status report comprises the identification of the new quality of service flow.

17. The apparatus as in claim 13, wherein the indication comprises one of indicating all new quality of service flows in the buffer status report, indicating first new quality of service flow identification in the buffer status report, indicating multiple new quality of service flows in the buffer status report, or indicating a new quality of service flow identification with tightest quality of service requirements if multiple new quality of service flows are received in the buffer of the user equipment before the buffer status report is transmitted by the user equipment.

\* \* \* \* \*